United States Patent [19]

Stambaugh et al.

[11] 4,161,452

[45] Jul. 17, 1979

[54] POLYOLEFINIC COPOLYMER ADDITIVES FOR LUBRICANTS AND FUELS

[75] Inventors: Robert L. Stambaugh, Hatboro; Richard A. Galluccio, Perkasie, both of Pa.

[73] Assignee: Rohm and Haas Company, Philadelphia, Pa.

[21] Appl. No.: 857,078

[22] Filed: Dec. 5, 1977

Related U.S. Application Data

[63] Continuation-in-part of Ser. No. 763,756, Jan. 28, 1977, abandoned.

[51] Int. Cl.$^2$ .................. C10M 1/32; C10M 3/26; C10M 1/24; C08L 23/00
[52] U.S. Cl. .................. 252/34; 44/62; 44/63; 252/50; 252/51.5 A; 252/56 D; 525/285; 525/384; 525/380
[58] Field of Search .................. 252/56 D, 34, 56 R, 252/50, 51.5 A; 260/878 R; 44/62, 63

[56] References Cited

U.S. PATENT DOCUMENTS

| | | | |
|---|---|---|---|
| 3,687,849 | 8/1972 | Abbott | 252/56 D |
| 3,914,203 | 10/1975 | Lee | 252/51.5 A |
| 3,929,800 | 12/1975 | Horowitz | 252/56 D |
| 4,033,888 | 7/1977 | Kiovsky | 252/56 D |
| 4,033,889 | 7/1977 | Kiovsky | 252/56 D |
| 4,063,010 | 12/1977 | Marie et al. | 252/51.5 A |
| 4,071,580 | 1/1978 | Alberts et al. | 260/878 R |
| 4,089,794 | 5/1978 | Engel et al. | 252/51.5 A |

Primary Examiner—Delbert E. Gantz
Assistant Examiner—Irving Vaughn

[57] ABSTRACT

Graft copolymers wherein the backbone polymer is a polymeric hydrocarbon such as ethylene/propylene copolymer and the grafted units are the residues of an addition copolymerizable monomer system comprising an unsaturated polycarboxylic acid or anhydride and at least one other addition monomer. Preferably, the monomer residues are post-reacted with an alcohol or an amino alcohol. The graft copolymers are prepared with a free radical initiator which is blended with the reactants at a temperature below the initiator decomposition temperature, followed by heating to the decomposition temperature. The graft copolymers impart combined detergent, viscosity index improvement and other useful properties to lubricating oils and hydrocarbon motor fuels.

24 Claims, No Drawings

POLYOLEFINIC COPOLYMER ADDITIVES FOR LUBRICANTS AND FUELS

BACKGROUND OF THE INVENTION

This application is a continuation-in-part of application Ser. No. 763,756 filed Jan. 28, 1977 now abandoned. A related application is Ser. No. 843,300 filed Oct. 18, 1977 wherein the graft monomers are nitrogen-containing.

This invention relates to graft copolymers as multi-purpose additives for lubricating oils and hydrocarbon motor fuels. More particularly, this application relates to graft copolymers, wherein the grafted monomer units are derived primarily from polar, oxygen-containing monomers, to methods of preparing the graft copolymers, and to lubricating oils and motor fuels containing the graft copolymers.

Internal combustion engine sludge is produced by the oxidative degradation of lubricating oils and by the partial oxidation of motor fuels and byproducts of motor fuel combustion. The partially oxidized byproducts of motor fuel combustion contain reactive intermediates such as aldehydes, acids and hydroxy acids which undergo complex condensation reactions to form insoluble resinous materials known as sludge and varnish. Accordingly, unless the components are dispersed relatively soon after formation, they will settle out of the lubricant, causing filter plugging and sticking of moving parts.

In the past, lubricating oils and hydrocarbon motor fuels have been formulated with several additives to provide a plurality of properties, including improved viscosity-temperature characteristics (viscosity index or "VI"), pour point depressancy, oxidation inhibition, anti-rust and detergency. However, multiple additives add substantially to the cost of a lubricating oil or motor fuel and cause problems of incompatibility and interaction of the additives. The graft copolymer additives of the present invention combine several of these properties in a single material and therefore provide a significant improvement over mixtures of additives.

While the grafting of polar monomers to polyolefinic backbones to form lubricating oil and motor fuel additives is known, as in U.S. Pat. Nos. 3,404,091, 3,687,849 and 3,687,905, the products obtained are deficient in various properties and/or are too costly, primarily because the products contain unduly high levels of byproducts of little or no usefulness, such as homopolymers. The graft copolymers of this invention are prepared in a manner which minimizes such byproduct formation.

SUMMARY OF THE INVENTION

The graft copolymers of the invention combine the efficient thickening properties of polyolefinic viscosity index improvers and the dispersancy provided primarily by polar, oxygen-containing materials by the grafting of certain polar, oxygen-containing monomers onto polyolefinic backbone polymers. The grafted units are derived from an addition copolymerizable monomer system comprising (1) an unsaturated polycarboxylic acid or anhydride thereof, and (2) at least one other (different) monomer copolymerizable with the unsaturated carboxylic acid or anhydride. Preferably, the grafted monomer system is post-reacted with an alcohol or an amino alcohol to cap the carboxyl groups of monomer component (1).

In another aspect of the invention, it has been found that the graft copolymers are efficiently produced with little or no wasteful byproduct by forming an intimate admixture of backbone polymer, copolymerizable monomer system and a free radical initiator, wherein the temperature of the mixture, at least during the time that the initiator is being uniformly dispersed therein, is maintained below the decomposition temperature of the initiator. Thereafter, the temperature is increased to or above the temperature at which the initiator decomposes, preferably while continuing agitation of the reaction mixture, to form a graft copolymer. The graft copolymer may then be reacted with the alcohol or amino alcohol.

In still another aspect of the invention, the substrate backbone polymer has a relatively high molecular weight, of the order of about 100,000–200,000 viscosity average molecular weight, and the copolymerizable monomers are grafted directly onto the backbone polymer. Contrary to prior practice, the backbone polymer is not degraded prior to the grafting. The molecular weight of the final graft copolymer is reduced by homogenization or other degrading technique so to provide the desired balance of thickening capability, viscosity index improvement, shear stability, detergency and other properties in lubricating oils or motor fuels.

The polar, oxygen-containing graft copolymers of this invention have the significant advantage over the nitrogen-containing graft copolymers of applicants' copending parent application Ser. No. 843,300 of lower production cost. In some cases the oxygen-containing graft copolymers of this invention may exhibit activity substantially equivalent to that of the nitrogen-containing graft copolymers of Ser. No. 843,300 but at lower additive concentrations, thus further enhancing economic advantage over the nitrogen-containing graft copolymers.

DETAILED DESCRIPTION

The backbone or substrate polymers are any substantially linear, substantially saturated, rubbery, olefinic hydrocarbon polymers which are oil soluble before or after grafting of the copolymerizable monomers thereon. By "substantially saturated" is meant less than 4 mole % olefinic unsaturation, preferably 2 mole % or less. Polymers having higher olefinic unsaturation are too oxidatively unstable when used in lubricating oils. Suitable backbone polymers include ethylene/propylene copolymers, ethylene/propylene/diene modified terpolymers, hydrogenated styrene-butadiene copolymers, styrene-isoprene copolymers and atactic polypropylene. Backbone polymers which can be rendered oil soluble by the grafting or after grafting include low density polyethylene, and the like. The backbone polymers may have a wide range of molecular weight, for example, of the order of about 10,000–200,000 viscosity average molecular weight, more usually about 100,000–150,000. Normally, the graft copolymerization will result in increased molecular weight of the order of about 200,000–400,000 viscosity average and even as high as 500,000 or more. More usually, the molecular weight will be increased to about 200,000–400,000 viscosity average.

The selection of backbone polymer molecular weight and the extent to which the molecular weight is permitted to increase during graft copolymerization depend primarily upon the handling properties of the starting polymer and the shear stability desired in the final product. Low molecular weight starting backbone polymers, the molecular weight of which is prevented from increasing substantially during grafting, will result in more shear stable graft copolymer products and therefore require little or no post-degradation to reduce the molecular weight to levels providing good shear stability. However, the lower molecular weight starting backbone polymer materials are more difficult to handle since they are semi-liquids or exhibit cold flow at ambient temperature (about 20° C.), and it is often difficult or uneconomical to control molecular weight during graft copolymerization. While use of a low molecular weight starting polymer may avoid the need for subsequently degrading the graft copolymer product, the difficulty of handling and processing such starting polymers tends to override any such advantage. Accordingly, it is preferred to use a somewhat higher molecular weight starting backbone polymer, of the order of at least about 100,000 viscosity average molecular weight, to avoid such problems. The molecular weight of the substrate polymer will differ, of course, depending upon the type of substrate backbone polymer.

The ethylene/propylene (EP) copolymers may have a wide range of ethylene/propylene ratios. Above about 80 mole percent ethylene, the copolymers are partially crystalline, thus losing their oil solubility and their utility as substrates for this invention. The more useful ethylene/propylene substrates contain about 50 to about 70 mole percent ethylene, have viscosity average molecular weights of about 10,000 to about 200,000 and $\overline{M}_w/\overline{M}_n$ of less than four. Lower propylene contents, higher molecular weights, and broader molecular weight distributions can be used but, as indicated above, such copolymers lead to grafted products which are generally less efficient as VI (viscosity index) improvers. In terms of Mooney viscosity (ASTM test D-1646, ML 1+8 at 125° C.) the EP substrate polymer should have a value of about 20-40 to avoid undue cold flow, preferably about 28±4. Above 50 the mixture tends to be too viscous for adequate mixing.

The ethylene/propylene diene modified terpolymers contain low levels (preferably less than 10%) of a nonconjugated diene such as 1,4-hexadiene, dicyclopentadiene or ethylidenenorbornene. Maximum ethylene is determined by crystallinity (solubility) considerations with the preferred range being about 45–65 mole percent ethylene. The more useful viscosity average molecular weight is also about 10,000 to about 200,000 with $\overline{M}_w/\overline{M}_n$ of less than eight. Again, substrates outside of these ranges can be used at some sacrifice in properties of the VI improver.

The hydrogenated styrene-butadiene copolymers are preferably random copolymers containing about 30 to about 55 weight percent butadiene and have viscosity average molecular weights of about 25,000 to about 125,000. Hydrogenation is over 95% of the olefinic unsaturation but less than 5% of the aromatic unsaturation.

In the case of the hydrogenated styrene-isoprene copolymers, the substrates are preferably but not exclusively block copolymers. The polymers may possess two or more blocks but in general the styrene blocks are of about 5000 to about 50,000 in molecular weight and have been reduced by hydrogenation of at least 50% of the aromatic groups while the isoprene units may range from about 10,000 to about 1,000,000 in molecular weight and are also reduced in olefinic unsaturation by at least 50%. Random copolymers fitting the general styrene-butadiene description may also be used.

Amorphous polypropylene of viscosity average molecular weight in the range of about 10,000 to about 200,000 can also be used as a substrate for grafting. This entire class of substrates will result in generally acceptable dispersants, but they tend to lead to graft copolymers which have somewhat poorer properties as VI improvers.

It will be understood by those skilled in the art that all of the above recited substrate polymers are specified so as to provide graft copolymers which are both superior dispersants and good viscosity index improvers. While polyolefinic substrates outside of these ranges can be used and will produce graft copolymers which are good dispersants, the products will be somewhat inferior as viscosity index improvers.

The unsaturated polycarboxylic acids or anhydrides comprising component (1) of the grafted monomer units include any such acids or anhydrides which graft by free radical addition polymerizable onto polymeric backbones. Representative of such compounds are maleic acid, fumaric acid, citraconic acid, mesaconic acid, itaconic acid, methylenemalonic acid, acetylenedicarboxylic acid, aconitic acid, the anhydrides of any of the foregoing acids, and similar acids and anhydrides containing about 4 to 12 carbon atoms. Maleic acid or maleic anhydride is preferred. Mixtures of any of the acids or anhydrides may be used.

Component (2) of the graft monomer system comprises any one or a mixture of monomers different from component (1) and which contain only one copolymerizable double bond and are copolymerizable with component (1). Typically, such monomers do not contain free carboxylic acid groups and are esters containing $\alpha,\beta$-ethylenic unsaturation in the acid or alcohol portion; hydrocarbons, both aliphatic and aromatic, containing $\alpha,\beta$-ethylenic unsaturation, such as the $C_4$–$C_{12}$ alpha olefins (e.g., isobutylene, hexene, nonene, dodecene, and the like) and styrenes (e.g., styrene, $\alpha$-methyl styrene, p-methyl styrene, p-sec. butyl styrene, and the like); and vinyl monomers, such as vinyl acetate, vinyl chloride, vinyl ketones such as methyl and ethyl vinyl ketone, and the like. Monomers containing functional groups which may cause crosslinking, gelation or other interfering reactions should be avoided, although minor amounts of such monomers (up to about 10% by weight of the monomer system) often can be tolerated.

Specific useful copolymerizable monomers include the following:

(A) Esters of saturated acids and unsaturated alcohols wherein the saturated acids may be monobasic or polybasic acids containing up to about 40 carbon atoms such as the following: acetic, propionic, butyric, valeric, caproic, stearic, oxalic, malonic, succinic, glutaric, adipic, pimelic, suberic, azelaic, sebacic, phthalic, isophthalic, terephthalic, hemimellitic, trimellitic, trimesic, and the like, including mixtures. The unsaturated alcohols may be monohydroxy or polyhydroxy alcohols and may contain up to about 40 carbon atoms, such as the following: allyl, methallyl, crotyl, 1-chloroallyl, 2-chloroallyl, cinnamyl, vinyl, methyl vinyl, 1-phenallyl, butenyl, propargyl, 1-cyclohexene-3-ol, oleyl, and the like, including mixtures.

(B) Esters of unsaturated monocarboxylic acids containing up to about 12 carbon atoms (such as acrylic, methacrylic and crotonic acid) and an esterifying agent, containing up to about 50 carbon atoms, selected from saturated alcohols and alcohol epoxides. The saturated alcohols may contain up to about 40 carbon atoms and are monohydroxy compounds such as: methanol, ethanol, propanol, butanol, 2-ethylhexanol, octanol, dodecanol, cyclohexanol, cyclopentanol, neopentyl alcohol, and benzyl alcohol; and alcohol ethers such as the monomethyl or monobutyl ethers of ethylene or propylene glycol, and the like, including mixtures. The alcohol epoxides include fatty alcohol epoxides, glycidol, and various derivatives of alkylene oxides, epichlorohydrin, and the like, including mixtures.

The components of the graft copolymerizable system are used in a ratio of monomer component (1) to monomer component (2) of about 1:4 to 4:1, preferably about 1:2 to 2:1 by weight.

After the graft polymerization the product preferably is reacted with an alcohol or an amino alcohol, containing up to about 40 carbon atoms. Suitable amino alcohols are the mono- and polyalkanol monoamines containing 2-20 carbon atoms and 1-6 hydroxy groups such as monoethanolamine, diethanolamine, triethanolamine, diethylaminoethanol, diethanolaminoethanol, the corresponding propanol amines, and the like, including mixtures. The alcohols include any of the saturated alcohols described with reference to the copolymerizable monomers which contain ester groups. Sufficient alcohol or amino alcohol is used to react with substantially all of the carboxylic acid groups of the carboxylic acid monomer component (1). Preferably, the alcohol or amino alcohol is used in excess (about 5-10% excess) over the stoichiometric amount).

The graft copolymers are prepared in accordance with conventional free radical copolymerization techniques except for those aspects of the invention relating to formation of an intimate admixture of the reactants with the free radical initiator at a temperature below the decomposition temperature of the initiator, and subsequent increase of reaction temperature above the decomposition temperature of the initiator. Typically, in terms of an ethylene/propylene copolymer as the substrate polymer backbone material, the backbone polymer is dissolved to a concentration of about 20-30% by weight in a suitable inert solvent such as a halogenated aromatic hydrocarbon at a temperature of about 80°-150° C. Dissolution of the polymer is promoted by suitable agitation such as magnetic or mechanical stirring. Graft monomer is then blended into the solution, usually at a lower temperature such as about 80° C., preferably also while the reaction mixture is being agitated. The graft monomers are added to the mixture in a total amount of about 5-30% by weight based on the ethylene/propylene copolymer, preferably about 10-20% by weight. If necessary, the temperature of the mixture is again lowered below the decomposition temperature of the initiator, and the initiator is added and uniformly admixed into the solution. Conditions of temperature, agitation, sequence and rate of addition are carefully selected to minimize homopolymerization and graft copolymerization at this point. The initiator is added in an amount of about 0.5-2% by weight based on the ethylene/propylene copolymer. After the initiator has been uniformly admixed, the temperature is gradually raised to or above the decomposition temperature of the initiator. In the case of t-butylperbenzoate initiator, the temperature is about 120°-140° C. This temperature is maintained until the reaction is substantially complete. About 1-2 hours reaction time is usually sufficient. The reaction product typically will contain about 2-20% by weight of the oxygen-containing graft monomers, preferably about 5-15% by weight.

The free radical initiator is any free radical source capable of hydrogen abstraction. Examples are alkyl peroxy esters, alkyl peroxides, alkyl hydroperoxides, diacyl peroxides, etc. While t-butyl perbenzoate is the preferred initiator, other suitable initiators include t-butyl peroctoate, di-t-butylperoxide, t-butylhydroperoxide, cumene hydroperoxide, benzoyl peroxide, and the like.

While the temperature for the grafting reaction may vary from about 80° C. to about 150° C., it will be understood that the temperature selected will depend upon the decomposition temperature of the initiator as well as the substrate polymer and graft monomers. Accordingly, it may be possible to run the grafting reaction at a temperature as low as 60° C. or as high as about 250° C.

As indicated above, a key aspect of the invention is formation of an intimate admixture of a substrate polymer, graft monomer and initiator prior to the grafting reaction and maintaining the temperature below the decomposition temperature of the initiator, at least during addition and blending of the initiator into the solution. This prevents formation of free radicals until the reactants are fully and intimately admixed. This procedure eliminates or substantially minimizes formation of undesirable by-products such as homopolymer, and maximizes grafting of oxygen-containing polar monomer.

During the grafting reaction any solvent medium may be used for the preparation of the graft copolymer provided the medium is substantially inert to the reactants, that is, the medium has little or no chain transfer capability. Halogenated aromatic hydrocarbons such as chlorobenzene and dichlorobenzene are preferred, particularly dichlorobenzene. However, aliphatic or aromatic hydrocarbons including mineral oil are useful in some cases.

Although the process has been illustrated in terms of dissolving the copolymerizable reactants in a solvent, the process may be operated without solvent if the substrate polymer and mixture with the graft monomers have sufficiently low melt viscosities for effective intimate admixture and grafting at the reaction temperatures. Order and rate of addition of the reactants and initiator are not critical, providing the temperature is controlled as indicated.

The post-reaction with alcohol or amino alcohol may be carried out in the graft copolymer reaction medium, or the graft copolymer may be concentrated or separated and redissolved, and alcohol or amino alcohol then added. Any temperature effective for the reaction may be used, such as about 80° to 300° C., more usually about 100°-200° C.

POST-DEGRADATION

When polymeric viscosity index improvers are subjected to the severe mechanical stresses of operating equipment, the polymers may be degraded, thus diminishing the favorable influence which such additives exert on viscosity-temperature properties of a lubricant or motor fuel. Polymers which resist this tendency to degrade mechanically in service are said to have good shear stability. The ability of viscosity index improvers to resist mechanical degradation with use is dependent on a number of factors, one of which is molecular weight. A very high molecular weight polymer, although imparting initially highly effective control of viscosity-temperature properties, will be very substantially degraded in service and thus lose much or even nearly all of its effect.

The graft copolymers prepared by the process of this invention may be too high in molecular weight to be usable even though they are good VI improvers; that is, they have poor shear stability. As indicated above, this derives in part from the technology and manufacturing processes which are employed in the rubber industry, in particular by makers of ethylene/propylene copolymers and terpolymers. Such polymers are routinely made at very high molecular weight so that the products will be relatively hard solids and therefore more easily handled and transported. When these rubbers are prepared in molecular weights appropriate for use as VI improvers, the polymers are very sticky solids, which flow or "creep" even at ambient temperatures. Although technology is available to process these lower molecular weights, as in the oxidative degradation processes of U.S. Pat. Nos. 3,404,091 and 3,687,849, special handling is required and the processing is slower, resulting in higher costs. Hence, when conventional ethylene/propylene rubbers are used in the process of this invention, the products are too high in molecular weight to provide acceptable shear stability.

Another factor adversely affecting the shear stability of the products of this invention is a result of an important aspect of the invention itself. During the grafting reaction, noticeable thickening takes place, and evaluation of the graft copolymer indicates that shear stability deteriorates during the grafting reaction. This very likely results from crosslinking that may occur as part of the reaction. Although it is possible to eliminate this crosslinking, the products so prepared generally are inferior dispersants. Hence, it appears to be inherent to some extent in the graft process of this invention that to obtain optimum dispersancy, some compromise in shear stability is necessary.

Means to bring the molecular weight down into the desirable range, that is, to where shear stability will be good, are readily available. It requires only mechanical or thermal degradation of the product subsequent to the grafting reaction to adjust the molecular weight to the preferred range. It is estimated that while the products of the grafting reaction may range upwards in viscosity average molecular weight to about 500,000 or more, the desired range for the final dispersant VI improver is about 30,000 to about 80,000.

Any convenient means of degradation, such as in a gear pump or extruder is acceptable but homogenization is preferred. In a homogenization process the polymer is forced at high pressure through a device which utilizes variously designed throttle valves and narrow orifices. Such a device can generate shear rates of about 5000 sec.$^{-1}$ and more preferably of between about 10,000 and about 1,000,000 sec.$^{-1}$. Commercial devices such as that from the Manton-Gaulin Manufacturing Company or modifications thereof may be employed. Such equipment may be operated at pressures of up to about 20,000 psi to generate the necessary shear stress. The homogenization process may be employed in either a batch or continuous mode, depending on the degree of degradation desired.

An additional benefit of homogenization is that the products of this invention become even more efficient thickeners than the commercially available non-dispersant ethylene/propylene copolymers. Hence, the products of this invention, when homogenization is also used, possess not only superior dispersancy characteristics but also an outstanding thickening ability/shear stability balance.

UTILITY

The products of this invention may be used in a wide variety of fuels and lubricants. They are primarily of utility in lubricants, where both their superior dispersancy and their influence on viscosity-temperature control are of value. Appropriate lubricant base stocks include oils of both mineral (petroleum) and synthetic origin. The oils may vary in viscosity from spindle oils to motor oils to gear oils. Suitable synthetic fluids include esters such as dialkyl adipate, dialkyl sebacate, or dialkyl azelate, triesters of trimethylolpropane, tetraesters of pentaerythritol, polyalkyleneglycol esters, phosphate esters, or synthesized hydrocarbons of the poly-$\alpha$-olefin or alkylbenzene types. Typical applications include hydraulic fluids, automatic transmission fluids, automative crankcase oils, gear oils, and greases.

The products of this invention may be used in lubricants at about 0.1% to about 5.0% by weight, preferably about 0.3–2.0% by weight, but more typically at about 0.6% to about 1.5%. As these products are rubbery solids, they are routinely manufactured as viscous concentrates at about 7 to about 15% solids in oil, and the commercial user would accordingly use an amount of the concentrate giving the above recited range of polymeric ingredient.

The lubricants containing the products of this invention may also include other additives to provide additional dispersancy, viscosity-temperature control, pour point depressancy, high temperature detergency, rust inhibition, anti-wear agents, antioxidants, extreme pressure agents, friction modifiers, anti-foam agents or dyes. Accordingly, there may be used with the products of this invention polybutene-based succinimides or esters, phosphosulfurized polybutenes, polyacrylates or polymethacrylates, polyisobutylene, ethylene/propylene copolymers or terpolymers, hydrogenated styrene-butadiene or styrene-isoprene, N-vinylpyrrolidone- or dimethylaminoethyl methacrylate-containing copolymers with methacrylates, styrene polyesters, ethylene-vinyl acetate copolymers or oligomers, dialkyl fumarate polymers or copolymers, esterified styrene-maleic anhydride copolymers or oligomers, hydrocarbon wax-naphthalene condensates of the Friedel-Crafts type, chlorinated hydrocarbons, alkaline earth sulfonates, phenates, salicylates or phenate sulfides, alkaline earth alkylnaphthalene sulfonates, zinc or other metallic dialkyldithiophosphates or diaryldithiophosphates, zinc, cadmium, lead, molybdenum, or other metallic dithiocarbamates, sulfurized or phosphosulfurized esters or terpenes, hindered phenols, phenothiazine or alkylated phenothiazines, naphthylamines, phenylenediamines, dibenzyl disulfide, sulfurized diisobutylene or tri-isobutylene, trialkyl or triaryl phosphites, tricresyl phosphate or silicone polymers, and the like.

When the products of this invention are used in hydrocarbon motor fuels, where primary use is made of their superior dispersancy, generally lower levels will be used, typically about 0.001% to about 0.1% by weight. The fuels include both gasoline and diesel types, and may also contain other additives such as antioxidants, metal deactivators, stabilizers, anti-rust agents, injector detergents, induction system deposit control additives or other carburetor detergents.

Throughout this specification and the following illustrative examples, all parts and percentages are by weight, unless otherwise stated. The detergency test data are based on the following test procedures:

DISPERSANCY TEST PROCEDURES

A. Asphaltenes Test

A method for determining the dispersing activity of any given polymer is based on the capacity of the polymer to disperse asphaltenes in a typical mineral oil. The asphaltenes are obtained by oxidizing a naphthenic oil with air under the influence of a trace of iron salt as catalyst, such as ferric naphthenate. The oxidation is desirably accomplished at 175° C. for approximately 72 hours by passing a stream of air through a naphthenic oil to form a sludge which may be separated by centrifuging. The sludge is freed from oil (extracting it with pentane). It is then taken up with chloroform and the resulting solution is adjusted to a solids content of about 2% (weight by volume).

When a polymer is to be examined for its dispersing activity, it is dissolved in a standard oil, such as a solvent-extracted 100 neutral oil. Blends may be prepared to contain percentages varying from about 2% to about 0.01% or even lower of polymer in oil.

A 10 ml. sample of a blend is treated with 2 ml. of the standard solution of asphaltenes in chloroform. The sample and reagent are thoroughly mixed in a test tube and the tube is placed in a forced draft oven at either 90° C. or 150° C. for two hours to drive off volatile material. The tube is then allowed to cool and the appearance of the sample is noted.

If the polymer has dispersing activity, the oil will appear clear although colored. Experience has demonstrated that, unless a polymer exhibits dispersing activity, at concentrations below about 2% in the above test, it will fail to improve the cleanliness of engine parts in actual engine tests.

B. Pyruvic Acid (PA) Test

Pyruvic acid can be considered a model for the highly polar, oxygenated substances which make up the sludge formed during engine operation. Fontana ("Macromolecules", 1(2), 139 (1968)) has described a method of measuring the ability of polymeric detergents to disperse pyruvic acid in hydrocarbon solvents. Such a phenomenon can be considered indicative of the ability of the detergent to disperse sludge.

The sample to be tested is blended at a concentration of 2% in light mineral oil. 10 grams of this blend and 0.25 grams of pyruvic acid are weighed into a 2 oz. jar and the capped jar is placed on a wrist shaker for 16 hours. The sample is then centrifuged (30 min./15,000 rpm) and the clear oil phase is decanted into a separate container. The oil solution is then titrated for acidity to determine the content of dispersed pyruvic acid. Results are reported as meq. of pyruvic acid/kg. of sample.

Typical data for a commercial polybutene-based succinimide follows:

| ADDITIVE | PA DISPERSANCY |
|---|---|
| 1% succinimide | 53 |
| 2% succinimide | 115 |
| 3% succinimide | 173 |

EXAMPLE 1

A five liter, 3 neck flask is equipped with a thermometer fitted via a flexible rubber mount attached to a ground glass adaptor, a C-type stirrer mounted in a ground glass adaptor via a Teflon insert, and a "Y" tube containing a pressure-equalized addition funnel and a water-jacketed condenser. Atop the condenser is fitted an inlet tube to provide a nitrogen atmosphere throughout the reaction zone. A Variac-controlled heating mantle is used as a heat source.

To the reaction flask is added 750 g. of o-dichlorobenzene. The solvent is heated with stirring to 120° C. and 225 g. of a 50/50 ethylene-propylene copolymer ("Epcar" 506, Goodrich Chemical Company) is added. The temperature is maintained at 150° C. for about 5 hours to complete solubilization. The temperature is then reduced to 80° C. and 22.5 g. of methyl acrylate and 11.25 g. of maleic anhydride is added over a period of 15 minutes. After an additional hour, 1.32 g. of t-butyl perbenzoate is added. The solution is then stirred at 80° C. for 30 minutes, followed by rapid heating to 130° C. An additional 1.32 g. of t-butyl perbenzoate is then added and stirring is continued at 140° C. for 1 hour. The solution is then diluted to 25% theoretical solids (based on oil) and is stripped at 1.5 mm Hg and 140° C. A final dilution with 100 neutral oil is then made to produce a concentrate containing 9.4% of graft copolymer.

Elemental assay of the polymer typically indicates grafting of about 5% methyl acrylate monomer and about 2.5% maleic anhydride onto the substrate polymer. Thickening efficiency is evaluated in a reference 160 N base oil containing 0.5% pour point depressant and 7.5% of a standard engine oil detergent inhibitor composition. The base oil has a viscosity of 6.20 cSt. (centistokes) at 210° F. The polymer concentrate when tested at about 8.2% in the reference base oil typically gives a solution having a viscosity of about 15 cSt. at 210° F. (measured by ASTM test procedure D-445) and about 20 P. (poise) at 0° F. (measured by ASTM test procedure D-2602). Shear stability (typically about 35% as measured by ASTM test procedure D-2603) can be improved, to give a product which is essentially stable in engine oil use, by homogenizing the polymer to a viscosity average molecular weight of about 30,000. The graft copolymer prior to homogenization when used at 2% in oil typically will disperse about 0.4% asphaltenes at 90° C. Pyruvic acid dispersancy is about 130 meq.

EXAMPLE 2

To a reaction vessel is charged 250 g. of a neutral oil solution containing 36.4 g. of the graft copolymer prepared in Example 1 and 10 g. of methanol. The mixture is heated to reflux and stirred for four hours after which excess methanol is removed by vacuum stripping to give, after dilution with neutral oil, a concentrate having a polymer solids content of 14.2%. The product concentrate, when added to the reference 160 N base oil at 6.2% and tested as in Example 1, will produce a solution having viscosities of about 15 cSt. at 210° F. and about 21 P. at 0° F. The shear stability (viscosity loss) can be improved by homogenization as indicated in Example 1. Asphaltenes dispersancy is improved over that of Example 1 when tested as described above.

EXAMPLE 3

The procedure of Example 2 is followed in all essential respects except that 10 g. of 1,2,4-butanetriol is used in place of methanol and water is removed azeotropically.

Infrared examination indicates complete conversion of the anhydride to ester. The product is diluted with neutral oil to provide a concentrate having about 10% polymer solids. The product concentrate, when blended at 7.0% in the reference 160 N base oil and tested as in Example 1, would be expected to give a solution having viscosities of about 15 cSt. at 210° F. and about 21 P. at 0° F. Shear stability of the product can be improved by homogenization as indicated in Example 1. The graft ester polymer product when used at 2% and tested as described above typically disperses 150 meq. of pyruvic acid.

EXAMPLE 4

The procedure of Example 1 is followed in all essential respects except that styrene, 22.5 g., is used in place of the methyl acrylate, and the initiator is cumene hydroperoxide. A graft copolymer is obtained which may be post-reacted with an alcohol or amino alcohol as described in Examples 2 and 6 to obtain polymers exhibiting good viscosity and dispersancy in lubricating oils. Shear stability is improved by homogenization.

EXAMPLE 5

The procedure described in Example 2 is repeated in all essential respects except for replacement of the methanol with monoethanolamine. The product polymer provides good thickening, VI improvement and dispersancy in engine lubricating oils.

EXAMPLE 6

The procedure of Example 1 is repeated in all essential respects except that a commercial ethylene/propylene/diene modified (EPDM) rubber containing 2.5% by weight hexadiene is used as the substrate polymer. A graft copolymer is obtained having good detergency and VI properties. Shear stability can be improved by homogenization.

EXAMPLE 7

The procedure of Example 1 is followed in all essential respects except that an hydrogenated styrene-butadiene (HSB) copolymer is used in place of the EP rubber. The graft copolymer product is a useful detergent and VI improver for lubricating oils. Shear stability can be improved by homogenization.

EXAMPLE 8

The procedure of Example 1 is followed in all essential respects except that a low density polyethylene is used in place of the EP copolymer. A graft copolymer providing good detergency and VI properties in lubricating oils is obtained. Shear stability is improved by homogenization.

We claim:

1. A composition comprising a major amount of a lubricating oil and a minor detergent amount of a graft copolymer prepared by intimately admixing (a) an oil soluble, substantially linear, substantially saturated, rubbery, olefinic hydrocarbon backbone polymer, (b) an addition copolymerizable graft monomer system comprising an unsaturated polycarboxylic acid or anhydride and at least one other monomer copolymerizable therewith, and (c) a free radical initiator capable of hydrogen abstraction, the temperature during admixing in the presence of the initiator being below the decomposition temperature of the initiator, and thereafter increasing the temperature of the mixture to or above the decomposition temperature of the initiator.

2. A composition as in claim 1 wherein the backbone polymer and copolymerizable monomers are dissolved in a solvent, and the initiator is thereafter intimately admixed therein while maintaining the temperature below the decomposition temperature of the initiator.

3. A composition as in claim 2 wherein the solvent is a halogenated aromatic hydrocarbon.

4. A composition as in claim 2 wherein the solvent is a mineral oil.

5. A composition as in claim 1 wherein the backbone polymer is selected from polyolefins, ethylene/propylene copolymers, ethylene/propylene/diene modified copolymers, hydrogenated styrene-butadiene copolymers, and hydrogenated styrene-isoprene copolymers.

6. A composition as in claim 1 wherein the graft copolymer is post-reacted with an alcohol or amino alcohol.

7. A composition as in claim 1 wherein the unsaturated polycarboxylic acid or anhydride is maleic acid or anhydride, said other monomer is methyl acrylate or styrene, and the graft copolymer is post-reacted with methanol, 1,2,4-butanetriol or monoethanolamine.

8. A composition as in claim 1 wherein the graft copolymer contains about 2–20% by weight of the graft monomer units.

9. A composition comprising a major amount of a hydrocarbon motor fuel and a minor detergent amount of a graft copolymer prepared by intimately admixing (a) an oil soluble, substantially linear, substantially saturated, rubbery, olefinic hydrocarbon backbone polymer, (b) an addition copolymerizable graft monomer system comprising an unsaturated polycarboxylic acid or anhydride and at least one other monomer copolymerizable therewith, and (c) a free radical initiator capable of hydrogen abstraction, the temperature during admixing in the presence of the initiator being below the decomposition temperature of the initiator, and thereafter increasing the temperature of the mixture to or above the decomposition temperature of the initiator.

10. A composition as in claim 9 wherein the graft copolymer is post-reacted with an alcohol or an amino alcohol.

11. A composition as in claim 9 wherein the backbone polymer and copolymerizable monomers are dissolved in a solvent, and the initiator is thereafter intimately admixed therein while maintaining the temperature below the decomposition temperature of the initiator.

12. A composition as in claim 9 wherein the solvent is a halogenated aromatic hydrocarbon.

13. A composition as in claim 9 wherein the solvent is a mineral oil.

14. A composition as in claim 9 wherein the backbone polymer is selected from polyolefins, ethylene/propylene copolymers, ethylene/propylene diene modified copolymers, hydrogenated styrene-butadiene copolymers, and hydrogenated styrene-isoprene copolymers.

15. A composition as in claim 8 wherein the unsaturated polycarboxylic acid or anhydride is maleic acid or anhydride and said other monomer is methyl acrylate or styrene, and the graft copolymer is post-reacted with methanol, 1,2,4-butanetriol or monoethanolamine.

16. A composition as in claim 9 wherein the graft copolymer contains about 2–20% by weight of the copolymerizable monomer units.

17. A graft copolymer useful as an additive for lubricating oils and hydrocarbon motor fuels, prepared by intimately admixing (a) an oil soluble, substantially linear, substantially saturated, rubbery, olefinic hydrocarbon backbone polymer, (b) an addition copolymerizable graft monomer system comprising an unsaturated polycarboxylic acid or anhydride and at least one other monomer copolymerizable therewith, and (c) a free radical initiator capable of hydrogen abstraction, the temperature during admixing in the presence of the initiator being below the decomposition temperature of the initiator, and thereafter increasing the temperature of the mixture to or above the decomposition temperature of the initiator.

18. The graft copolymer of claim 17 wherein the grafted monomer units are post-reacted with an alcohol or amino-alcohol.

19. The graft copolymer of claim 17 wherein the backbone polymer is selected from polyolefins, ethylene/propylene copolymers, ethylene/propylene/diene modified copolymers, hydrogenated styrene-butadiene copolymers, and hydrogenated styrene-isoprene copolymers.

20. The graft copolymer of claim 17 wherein the unsaturated polycarboxylic acid or anhydride is maleic acid or anhydride, said other monomer is methyl acrylate or styrene, and the grafted monomer units are post-reacted with methanol, 1,2,4-butanetriol or monoethanolamine.

21. A process for preparing an oil soluble graft copolymer useful as an additive for lubricating oils and hydrocarbon motor fuels, comprising the steps of (1) intimately admixing (a) an oil soluble, substantially linear, substantially saturated, rubbery, olefinic hydrocarbon backbone polymer, (b) an addition copolymerizable graft monomer system comprising an unsaturated polycarboxylic acid or anhydride and at least one other monomer copolymerizable therewith, and (c) a free radical initiator capable of hydrogen abstraction, and (2) thereafter increasing the temperature of the mixture to or above the decomposition temperature of the initiator.

22. The process of claim 21 wherein the backbone polymer and copolymerizable graft monomers are dissolved in a solvent, and the initiator is thereafter intimately admixed therein while maintaining the temperature below the decomposition temperature of the initiator.

23. The process of claim 21 wherein the solvent is a chlorinated aromatic hydrocarbon or a mineral oil.

24. The process of claim 21 wherein the graft copolymer is post-reacted with an alcohol or amino alcohol.

* * * * *